United States Patent [19]
Cragun

[11] Patent Number: 5,412,189
[45] Date of Patent: May 2, 1995

[54] TOUCH SCREEN APPARATUS WITH TACTILE INFORMATION

[75] Inventor: Brian J. Cragun, Rochester, Minn.

[73] Assignee: International Business Machines Corporation, Armonk, N.Y.

[21] Appl. No.: 993,749

[22] Filed: Dec. 21, 1992

[51] Int. Cl.⁶ .............................................. G06F 15/30
[52] U.S. Cl. ..................... 235/379; 235/380; 235/381; 902/20; 902/25; 434/113; 434/112; 341/21; 341/34
[58] Field of Search ............... 235/379, 380, 381; 902/10, 25, 20; 434/113, 112, 115; 341/21, 22, 23, 33, 34; 345/173

[56] References Cited

U.S. PATENT DOCUMENTS

| | | | |
|---|---|---|---|
| 4,752,772 | 6/1988 | Litt et al. | 340/712 |
| 4,760,245 | 7/1988 | Fukaya | 235/379 |
| 4,893,115 | 1/1990 | Blanchard | 341/23 X |
| 5,185,515 | 2/1993 | Nishibe | 235/382 |
| 5,222,895 | 6/1993 | Fricke | 434/115 X |
| 5,244,288 | 9/1993 | Nagaoka et al. | 434/115 X |

FOREIGN PATENT DOCUMENTS

| | | | |
|---|---|---|---|
| 0010387 | 1/1985 | Japan | 235/379 |
| 1272868 | 12/1986 | Japan | 235/380 |
| 0319784 | 12/1989 | Japan | 434/113 |
| 0496894 | 3/1992 | Japan | 235/380 |

OTHER PUBLICATIONS

Japanese Patent Appl., Abstract, Imamichi et al., Appln. No. 62-186359, Aug. 14, 1987, "Cash Automatic Transaction Processing Unit".

*Primary Examiner*—Donald Hajec
*Assistant Examiner*—Esther H. Chin
*Attorney, Agent, or Firm*—Curtis G. Rose; Steven W. Roth

[57] ABSTRACT

A touch screen apparatus with tactile feedback is disclosed. Tactile information, such as Braille or other symbolic representations, is integrally connected to an area on the touch screen surface. This tactile information can be molded into the touch screen surface as part of its initial manufacturing process, or can be added later by making the tactile information our of epoxy or or by placing a plastic film containing the tactile information over the touch screen surface. The touch screen display can be part of a desktop or laptop computer, can be part of a computer system in a public information kiosk or automated teller machine application, or can be included as an information panel in stereo equipment, transportation equipment, etc.

11 Claims, 3 Drawing Sheets

TOUCH SCREEN APPARATUS WITH TACTILE INFORMATION

FIELD OF THE INVENTION

This invention relates to the data processing field. More specifically, this invention is a touch screen display containing tactile information, such as Braille or other symbolic representations.

BACKGROUND OF THE INVENTION

As the computer industry moves towards user interfaces that are more and more graphically oriented, most users are noticing an improved ease of use. But visually impaired people find graphically oriented computers, automatic teller machines, public information kiosks and the like extremely difficult for them to use, if not outright impossible. This schism between sighted and visually impaired users is even wider with the ever increasing use of touch screen technology, since keyboards or other input devices are no longer required, and the only feedback given to a user is often exclusively visual. A visually impaired user cannot use a conventional touch screen display, since he has no idea where to touch the display to instruct the computer to do what he wants it to do, and cannot receive any sufficient feedback indicating what is happening. Frustrations of not being able to perform the routine daily functions of their sighted friends, such as withdrawing money from an automatic teller machine, makes their disability even more unfortunate, both to them personally and to society as a whole.

SUMMARY OF THE INVENTION

It is a principle object of the invention to enhance the operation of a computer system.

It is another object of the invention to improve the ease of use of a computer system for visually impaired and sighted users.

It is another object of the invention to improve the ease of use of touch screen displays for visually impaired and sighted users.

It is another object of the invention to improve the ease of use of touch screen displays for visually impaired users without adversely impacting the ease of use of touch screen displays for sighted users.

These and other objects are accomplished by the touch screen apparatus with tactile feedback disclosed herein.

A touch screen apparatus with tactile feedback is disclosed. Tactile information, such as Braille or other symbolic representations, is integrally connected to an area on the touch screen surface. This tactile information can be molded into the touch screen surface as part of its initial manufacturing process, or can be added later by making the tactile information out of epoxy or by placing a plastic sheet containing the tactile information over the touch screen surface. The touch screen display can be part of a desktop or laptop computer, can be part of a computer system in a public information kiosk or automated teller machine application, or can be included as an information panel in stereo equipment, transportation equipment, etc.

DESCRIPTION OF THE PREFERRED EMBODIMENT

Figure 1:
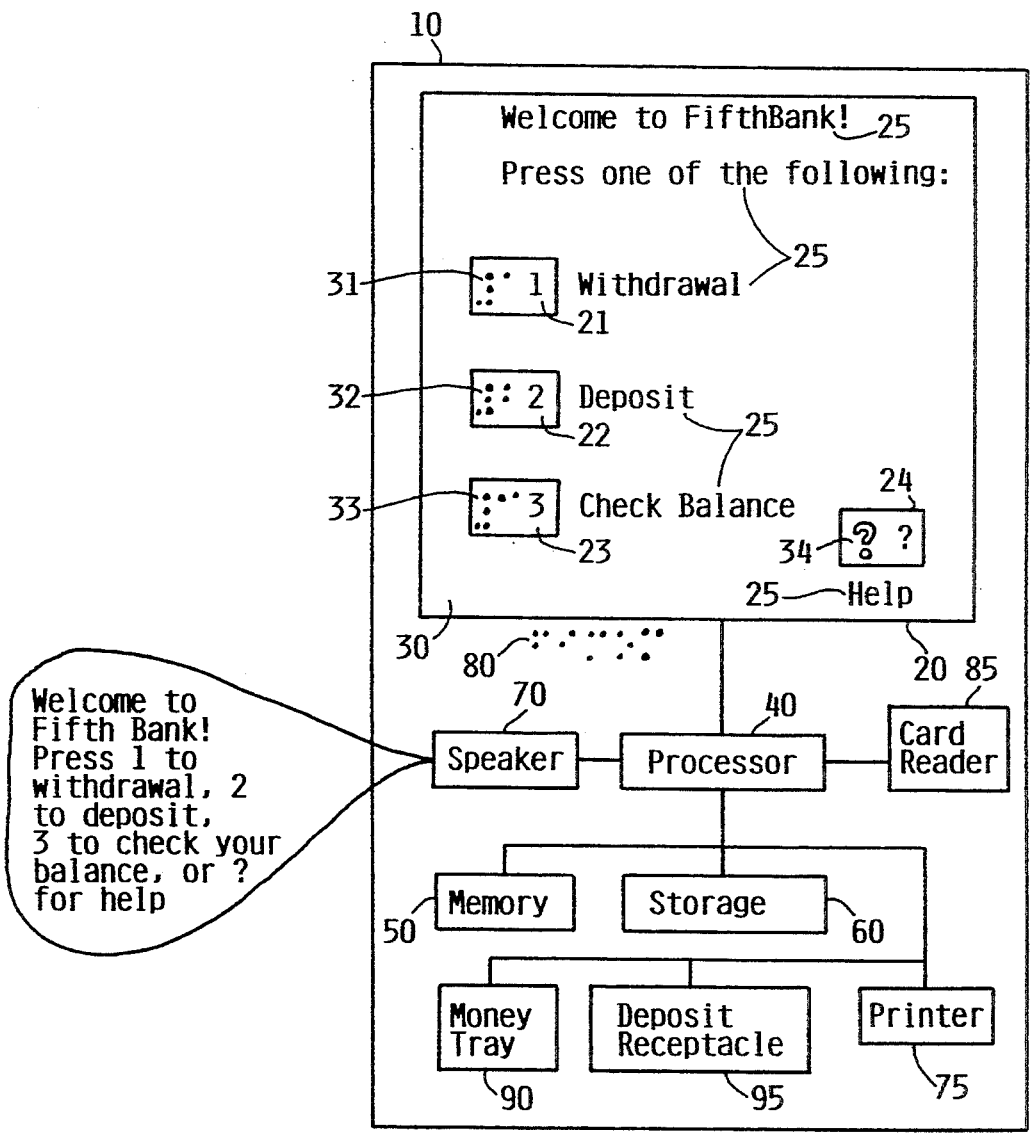
FIG. 1 shows a block diagram of a automated teller machine using the touch screen apparatus with tactile information of the invention.

FIG. 1 shows a block diagram of an exemplary automated teller machine (ATM) using the touch screen apparatus with tactile information of the invention. ATM 10 contains touch screen display 20, processor 40, memory 50, storage unit 60, and speaker 70. ATM 10 also contains a card reader 85, printer 75, money tray 90 and deposit receptacle 95. Touch screen display 20 displays textual data 25 and input touch regions 21–24. Touch screen display 20 has touch screen surface 30. Tactile information 31–34 is integrally connected to touch screen surface 30, and corresponds to input touch regions 21–24, respectively. Tactile information 31, 32, and 33 are one or more dots arranged as prescribed by the international standard Braille character set, and represent the characters "1", "2", and "3", respectively. Tactile information 34 is a symbol located in the lower right hand corner of touch screen surface 30. Preferably, tactile information 31–34 is within touch sensing regions 21–24, but could also be adjacent to these regions or have their own touch regions. Those skilled in the art will appreciate that processor 40, memory 50, and storage 60 are normally not visible by any ATM user, sighted or not, as these devices are kept under the covers of the ATM.

In the preferred embodiment, touch screen display 20 is an IBM Model 8516 touch screen. While this touch screen display detects touch by using strain gage technology, other touch screens, such as those employing optical or electrostatic technology, could also be used and still fall within the spirit and scope of the invention. Processor 40, memory 50, storage 60, and speaker 70 preferably are standard components of a personal computer system, such as an IBM PS/2, although they could also be standalone components. Printer 75, card reader 85, money tray 90, and deposit receptacle 95 are conventionally used in the ATM industry. Description 80 can be read by visually impaired users to inform them about the function of the machine.

Figure 2:
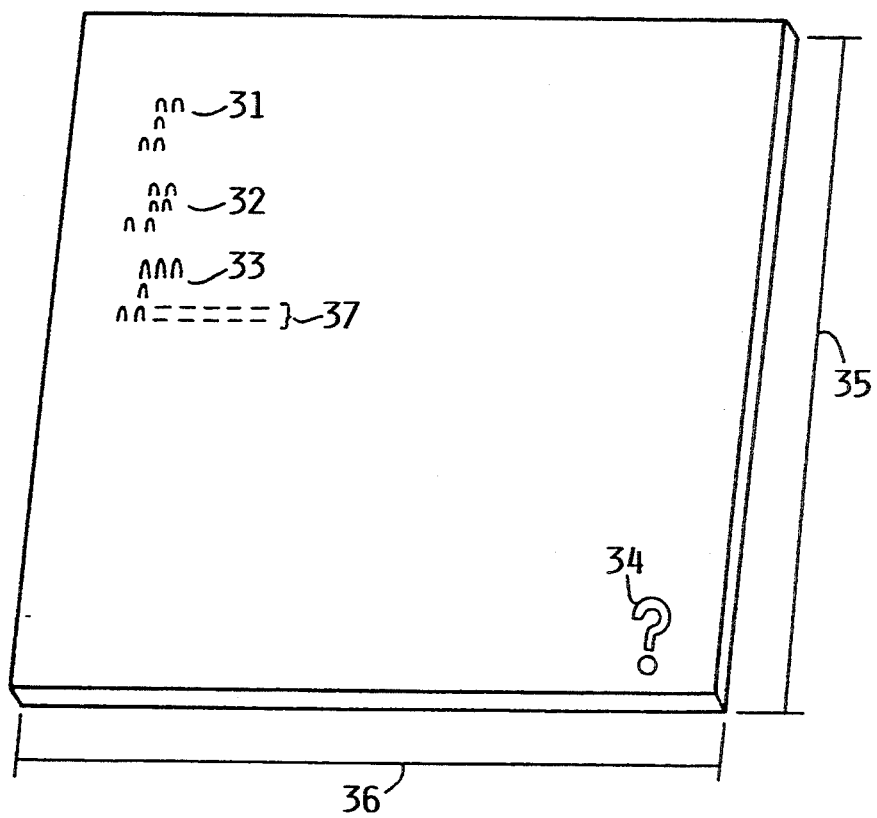
FIG. 2 shows an isometric view of the touch screen surface of the invention.

FIG. 2 shows an isometric view of touch screen surface 30 of the invention. Touch screen surface 30 has a height 35, and a width 36. In touch screen display 20 of the preferred embodiment, touch screen surface 30 is composed of a single piece of glass, although plastic or other material may be used. Tactile information 31–34 is shown integrally connected to an area of touch screen surface 30. Touch screen surface 30 is relatively smooth and uniform to the touch, except where the area of touch screen surface 30 is integrally connected to tactile information 31–34. Tactile information 31–34 has a depth 37 sufficient to allow tactile information 31–34 to be perceived by human touch. In the preferred embodiment, depth 37 is the Braille standard depth of 0.53 mm, although other values for depth 37 could be used as long as it still results in tactile information 31–34 being perceivable by human touch.

In the preferred embodiment, tactile information 31–34 is integrally connected to touch screen surface 30 by having it molded into touch screen surface 30 when this surface is initially manufactured. For example, if touch screen surface 30 is made of glass, molten glass is forced into a mold that includes tactile information 31–34, and is allowed to cool. After the molten glass solidifies, the mold is removed. An alternate method of integrally connecting tactile information 31–34 to touch screen surface 30 is by applying small drops of clear epoxy to touch screen surface 30 to make tactile information 31–34. For example, tactile information 31 can be made by placing five small drops of epoxy within touch sensing region 21, and allowing it to dry. This method is particularly useful in retrofitting existing touch screen displays already out in the field. All that is needed is a tube of epoxy, and preferably a mask to insure proper positioning of the tactile information on touch screen display 20. Devcon 5 Minute Epoxy, manufactured by the Devcon Corporation, Wood Dale, Ill., is preferred for this alternate method, although other types of epoxy or similar adhesive could also be used. Ideally, the epoxy selected will dry to a relatively transparent consistency so as not to unacceptably interfere with the appearance of any visual data underneath the tactile information. Lens effect errors are minimal as long as the tactile information does not get too large.

Another alternate method of integrally connecting tactile information 31–34 to touch screen surface 30 is by covering touch screen surface 30 with a clear plastic sheet having tactile information 31–34 molded or punched thereon. For example, the plastic sheet could be pressed in a mold containing the tactile information, heated to deform the plastic sheet to the shape of the mold, and allowed to cool. This plastic sheet can then cover all or some of the touch screen surface, affixed either by surface tension or adhesive. A plastic sheet preferred for this alternate method is Polyethylene Terephthalate Glycol (PETG) having an approximate thickness of 40 mils, although other materials having varied thicknesses could also be used.

Referring again to FIG. 1, a visually impaired user would approach ATM 10, and could quickly surmise by detecting the braille markings on touch screen display 20 that ATM 10 was specially designed or adapted for use by the visually impaired. Alternately, speaker 70 could announce that Braille or other symbols were available for the visually impaired. ATM 10 could also contain a brief description 80 in Braille (or equivalent) telling a visually impaired user about the function of the machine. A visually impaired user could read description 80, determine this was a "visually-impaired friendly" ATM that was affiliated with his bank, put in his bank card, and press touch sensing region 21 (underneath or closely associated with tactile information 31, the braille "1"), to withdraw money from his bank. Subsequent screens could use tactile information 31–34 for other purposes; for example, the next screen may assign tactile information 31 to a request to withdraw $10. Speaker 70 is preferably employed to give the visually impaired user aural feedback of his actions. Tactile information 34, which may be a question mark sign or other symbol, such as a triangle, could be used to direct a visually impaired user to touch sensing region 24 associated with a "help" key.

Sighted users may also find the tactile information to improve the usability of touch screens for them, since it helps give them feedback that they are touching in the correct area.

Figure 3:
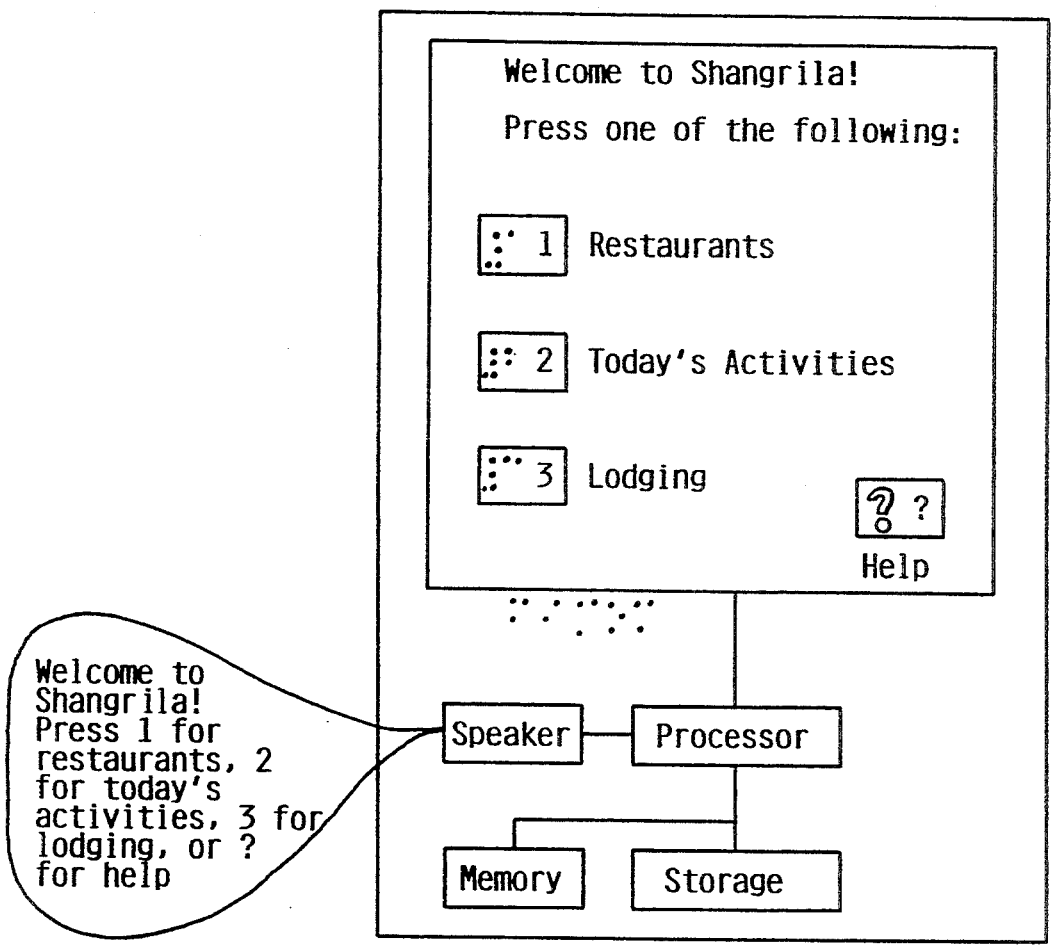
FIG. 3 shows a block diagram of a public information kiosk using the touch screen apparatus with tactile information of the invention.

FIG. 3 is similar to FIG. 1, but shows touch screen display 20 used with a computer system in a public information kiosk application.

While this invention has been described with respect to the preferred and alternate embodiments, it will be understood by those skilled in the art that various changes in detail may be made therein without departing from the spirit, scope and teaching of the invention. For example, touch screen 20 could also be used as an information panel in consumer products, such as stereo equipment, or in transportation equipment, such as planes, trains, or automobiles. Other methods of integrally connecting tactile information to touch screen surface 30 could also be employed. For example, the tactile information could be drilled or molded into the touch screen surfaces. In this case, the "depth" of the tactile information is measured into the touch screen surface instead of out from the touch screen surface. Accordingly, the herein disclosed is to be limited only as specified in the following claims.

What is claimed is:

1. A touch sensitive screen display, comprising:
   a touch sensitive screen surface having a height and a width;
   tactile information integrally connected to at least one touch sensing region on said touch sensitive screen surface, said tactile information having a depth;
   wherein said touch sensitive screen surface is relatively smooth except for said at least one touch sensing region; and
   wherein said depth of said tactile information is sufficient to allow said tactile information to be perceived by human touch.

2. The touch sensitive screen display of claim 1, wherein said tactile information is comprised of one or more Braille characters.

3. The touch sensitive screen display of claim 1, wherein said tactile information is comprised of one or more symbols.

4. The touch sensitive screen display of claim 1, wherein said tactile information is composed of epoxy cement.

5. The touch sensitive screen display of claim 1, wherein said tactile information is contained on a sheet covering said touch sensitive screen surface.

6. The touch sensitive screen display of claim 1, wherein said tactile information is molded into said touch sensitive screen surface.

7. A computer system, comprising:
   a processor;
   memory, connected to said processor;
   storage media, connected to said processor;
   a touch sensitive screen display, further comprising:
   a touch sensitive screen surface having a height and a width;
   tactile information integrally connected to at least one touch sensing region on said touch sensitive screen surface, said tactile information having a depth;
   wherein said touch sensitive screen surface is relatively smooth except for said at least one touch sensing region; and
   wherein said depth of said tactile information is sufficient to allow said tactile information to be perceived by human touch.

8. The computer system of claim 7, further comprising a speaker connected to said processor.

9. An automated teller machine, comprising:
a processor;
memory, connected to said processor;
a card reader, connected to said processor;
a printer, connected to said processor;
a money tray, connected to said processor;
storage media, connected to said processor;
a touch sensitive screen display, further comprising:
a touch sensitive screen surface having a height and a width;
tactile information integrally connected to at least one touch sensitive region on said touch sensitive screen surface, said tactile information having a depth;
wherein said touch sensitive screen surface is relatively smooth except for said at least one touch sensitive region; and
wherein said depth of said tactile information is sufficient to allow said tactile information to be perceived by human touch.

10. The automated teller machine of claim 9, further comprising a speaker connected to said processor.

11. The automated teller machine of claim 9, further comprising a deposit receptacle connected to said processor.

* * * * *